(12) United States Patent
Kiritzov et al.

(10) Patent No.: US 6,816,879 B1
(45) Date of Patent: Nov. 9, 2004

(54) SYSTEM AND METHOD FOR SERVING PRE-GENERATED PRESENTATION VIEWS OF REQUESTED DATA

(75) Inventors: Stefan Kiritzov, Castro Valley, CA (US); Benjamin Chang, Atherton, CA (US); Mark Scardina, San Francisco, CA (US)

(73) Assignee: Oracle International Corp., Redwood Shores, CA (US)

( * ) Notice: Subject to any disclaimer, the term of this patent is extended or adjusted under 35 U.S.C. 154(b) by 773 days.

(21) Appl. No.: 09/728,891

(22) Filed: Dec. 2, 2000

(51) Int. Cl.[7] .......................... G06F 13/00; G06F 17/30
(52) U.S. Cl. .......................................... 709/200; 707/3
(58) Field of Search ................................. 709/200, 201, 709/203, 217, 218, 219; 707/2, 3, 4, 102, 200

(56) References Cited

U.S. PATENT DOCUMENTS 6,139,197 A * 10/2000 Banks ........................ 709/217
6,542,925 B2 * 4/2003 Brown et al. ............... 709/208
6,654,737 B1 * 11/2003 Nunez ............................ 707/3

* cited by examiner

Primary Examiner—Moustafa M. Meky
(74) Attorney, Agent, or Firm—Park, Vaughan & Fleming, LLP

(57) ABSTRACT

A system and method are provided for generating presentation views of data in advance of a request for, or an operation involving, the data. A trigger initiates the generation of a presentation view after the passage of a predetermined period of time, when the data is altered or replaced, or in response to some other recognizable situation or event. The amount of system resources (e.g., processor time, memory) expended to satisfy a request may thus be decreased in comparison to a system in which presentation views are generated each time data is retrieved. One trigger may apply to any number of data items and may employ different trigger criteria (e.g., time periods) for different items. Multiple presentation views (e.g., in different formats) may be generated for a data item so as to serve multiple types of devices. A trigger may be customized for a particular device or type of device, and its profile (e.g., how many presentation views are generated) may change over time.

24 Claims, 2 Drawing Sheets

SYSTEM AND METHOD FOR SERVING PRE-GENERATED PRESENTATION VIEWS OF REQUESTED DATA

BACKGROUND

This invention relates to the fields of computer systems and databases. More particularly, a system and methods are provided for serving a pre-generated presentation view of data in response to a request for the data.

The distributed nature of database operating environments is typically manifested by a multi-tier architecture in which client systems from which users submit data requests and operations are separated from a data server hosting a database containing the data being manipulated. A middle-tier server (e.g., a web server or application server) may be positioned between the client systems and the data server.

Thus, in a typical three-tier architecture a data request is originated at a client through a browser or other suitable interface. The request is submitted to a middle-tier server in a particular format (e.g., HTTP or Hypertext Transport Protocol). The HTTP request is received by a servlet (e.g., a server applet) or other module designed to parse the request, and an appropriate SQL (Structured Query Language) query is generated to locate the requested data in a database hosted by a data server. The middle-tier server then connects to the data server, the query is executed and a set of results is returned to the middle-tier server.

On the middle-tier server, the results may be transformed into a form suitable for returning to the client (e.g., a form recognizable and displayable by the client browser). For example, the data may be formatted according to XML (eXtensible Markup Language) and a style sheet may be applied to generate a presentation view of the data that can be readily displayed by the browser.

This method of retrieving, formatting and presenting data to a user is very resource-intensive. More specifically, each time the middle-tier server satisfies a data request, a measurable amount of processor time and memory are required to complete the task. In particular, generating the presentation view of the data can be especially demanding of the middle-tier server's resources. For each additional user or request an additional increment of processor time and memory are required.

What is needed then is a system and a method for responding to a data request with suitable presentation views of the requested data, that scales well as additional requests are made. In particular, a desirable system and method would operate without requiring an unsupportable amount of resources during heavy periods of data requests.

SUMMARY

In one embodiment of the invention a system and methods are provided for retrieving and serving presentation views of data targeted by data requests received at a middle-tier server (e.g., a web server, an application server). In this embodiment a database stores data that may be requested by users (e.g., through client browsers) and also stores presentation views of the data formatted to be readily displayable by the client browsers. Thus, a presentation view may be generated by applying a style sheet to the data to format the data according to HTML (Hypertext Markup Language), SGML (Standard Generalized Markup Language), WML (Wireless Markup Language), etc.

The presentation views are generated on a time and/or event basis, as specified by applicable triggers. Thus, one trigger may initiate the generation of a set of presentation views on a regular, time-sensitive, basis (e.g., every ten seconds, every hour). Another trigger may initiate the generation of a presentation view for a particular data item when that data item is altered, updated or replaced.

In one method of the invention a data request is received at a middle-tier server, which generates a suitable query to locate the requested data in a database. The middle-tier connects to a data server hosting the database (if the database is not resident on the middle-tier server) and the query is executed. Instead of receiving the queried data, which would then have to be formatted for service to the originator of the request, the data server provides a pre-generated presentation view of the data. The middle-tier server can then serve the presentation view, thereby greatly decreasing the level of middle-tier resources required to service the request.

An embodiment of the invention is customizable to individual client devices (e.g., smart telephone, wireless PDA (Personal Digital Assistant)). In this embodiment a first data request received at a middle-tier server from a client device may be handled in a pre-existing manner, in which the requested data is retrieved from a database, formatted on the middle-tier server and then served to the client. However, the capabilities and/or preferences of the client or user are noted and are then used to pre-generate presentation views of data in anticipation of another request from the same client. If another request is received, the customized presentation view can then be retrieved and quickly served rather than retrieving just the underlying data and having to generate the presentation view on the fly.

DETAILED DESCRIPTION

Figure 1:
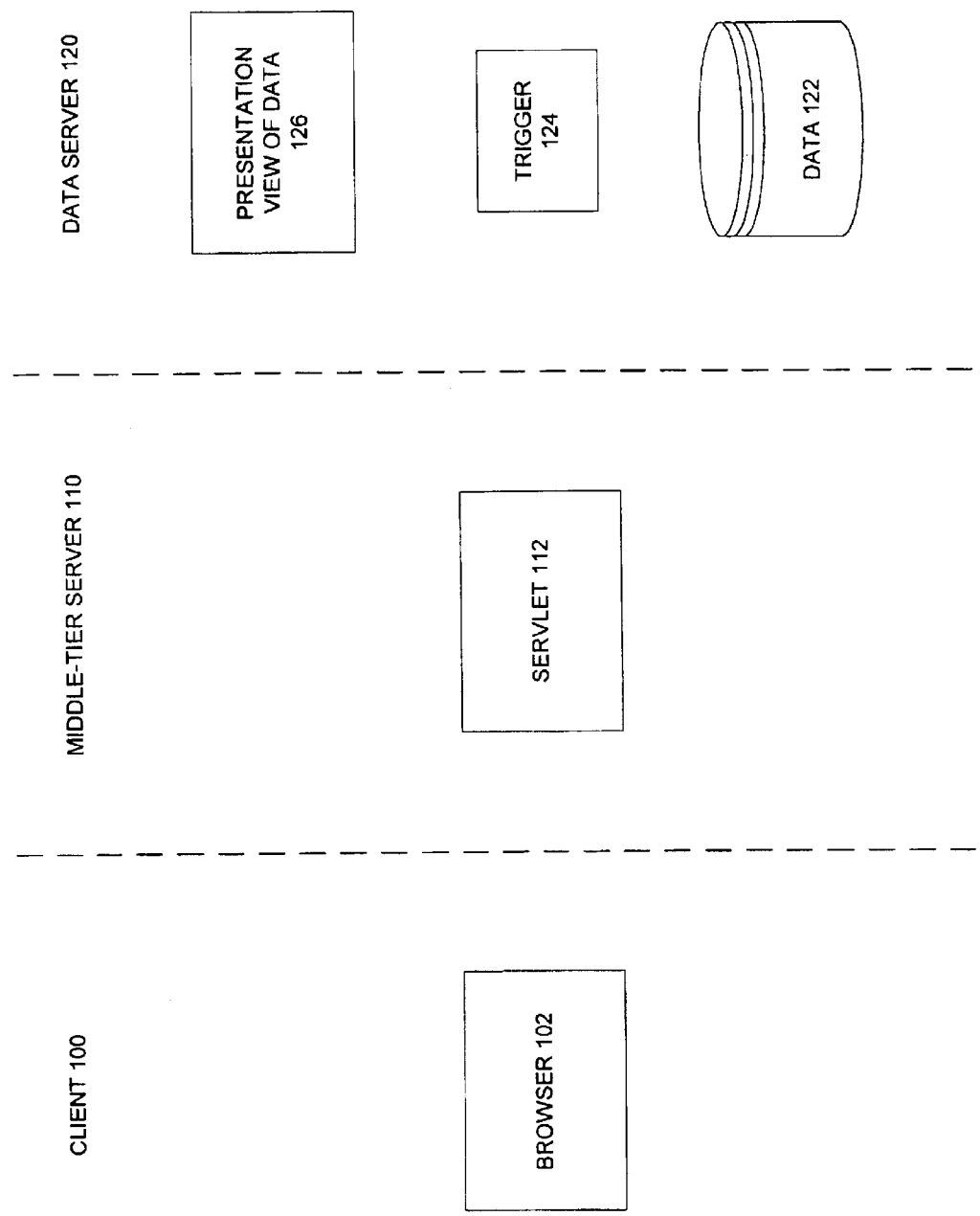
FIG. 1 is a block diagram depicting an implementation of an embodiment of the invention suitable for a three-tier computing environment.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer, personal digital assistant, wireless telephone, etc. Details of such devices (e.g., processor, memory, data storage, display) are omitted for the sake of clarity.

It should also be understood that the techniques of the present invention might be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a storage medium such as a carrier wave, disk drive, or computer-readable medium. Exemplary forms of carrier waves may take the form of electrical, electromagnetic or optical signals conveying digital data streams along a local network or a publicly accessible network such as the Internet.

In one embodiment of the invention a system and methods are provided for serving presentation views of requested data. Data may, for example, be requested by a browser operating on a client device such as a personal computer, hand-held computer, smart telephone or other wireless device. A data request is received at a middle-tier server, which may be a web server, application server or other computer system configured for receiving and responding to data requests. A request is analyzed and a suitable data query is generated to locate the requested data in a database, table or other data store. The data may be stored on a separate computer system (e.g., a data server). Instead of returning just the requested data, however, the data server retrieves and returns to the middle-tier server a pre-generated presentation view of the data. The presentation view may, for example, have been generated by applying a style sheet to the requested data (or an XML (eXtensible Markup Language) version of the data). The middle-tier server receives the presentation view and serves it to the client.

In this embodiment, the generation of a presentation view for a data item or a set of data is controlled or determined by a trigger. A trigger may initiate such generation after a period of time passes (e.g., from the last generation of a presentation view for the data), in response to the alteration or replacement of the data, on a random basis, etc.

Advantageously, by retrieving and serving pre-generated presentation views, data is provided to a requesting device faster than it would be if the middle-tier server (or other computer system) had to retrieve the requested data and generate a presentation view after a request is received. The amount of system (e.g., middle-tier server) resources required to service numerous data requests is thereby greatly decreased.

The types of presentation views, such as HTML (Hypertext Markup Language), WML (Wireless Markup Language), SGML (Standard Generalized Markup Language) and the data for which presentation views are pre-generated can be dynamic. In other words, for a given data item or data set, any number of presentation views may be pre-generated, and the number and types of views may change over time as requests for the data are received from different devices or different types of devices having different display capabilities or requirements. For example, only HTML pages may be pre-generated for one data set until a device that requires WML views submits a request for the data. Then WML views may also be pre-generated. Similarly, a presentation view may be pre-generated for only a subset of all available data. Thus, for a table of Employee data in an organization, presentation views may only be pre-generated for commonly requested records or objects, for records that have been recently requested, etc.

Illustratively, a presentation view may be stored within a database that already stores the original data or may be stored separately. For example, in an Oracle Server® database, a presentation view may be stored as a CLOB (character large object) file within the same database.

FIG. 1 depicts an illustrative three-tier computing environment in which an embodiment of the invention may be implemented. The illustrated environment comprises client device 100 (e.g., a wireless telephone or PDA (Personal Digital Assistant), portable computer), middle-tier server 110 (e.g., a web server) and data server 120.

As depicted in FIG. 1, client 100 operates browser (or other module, such as a Java® application) 102 for viewing data. The browser may be capable of displaying data in various formats (e.g., HTML, WML) or may require a specific format. In this embodiment of the invention, data requests are initiated from client 100, by a user, through browser 102.

Middle-tier server 110 operates servlet (i.e., server applet) 112 for receiving and responding to data requests from client devices. Servlet 112 may be configured specifically for cooperation with a particular set of clients and/or data, or may be capable of handling and servicing requests from various devices for data stored in multiple locations.

Data server 120 maintains database 122, which stores data requested by client 100. Presentation view 126 is pre-generated for a subset of the data of database 122, on a schedule determined by trigger 124. Although presentation view 126 is depicted separately from database 122 in FIG. 1, in alternative embodiments of the invention a presentation view may be stored within the database or on some other computer system (e.g., middle-tier server 110). Trigger 124 may comprise a stored procedure, a Java applet or other utility or application associated with (or included in) database 122.

In the embodiment of FIG. 1, data server 120 also includes the necessary utilities or applications (not separately shown in FIG. 1) for generating presentation view 126 from data within database 122. Illustratively, database 122 may be an Oracle Server® database, in which case this functionality may be included within the database. Specifically, Oracle Server® version 8i is Java-capable, in that it can manipulate Java objects and operate Java applets (e.g., to apply XSL (eXtensible Stylesheet Language) style sheets). The database engine may thus incorporate an XML SQL utility to place data into the XML format and apply an XSL style sheet.

In one specific implementation of the embodiment of FIG. 1, database 122 is an Oracle Server® database storing one or more tables of data required by devices such as client 100. On a schedule determined by trigger 124, presentation view 126 is pre-generated from a subset of the data stored in database 122 (e.g. all or a portion of a particular table). In this implementation a presentation view may be generated when a predetermined period of time (e.g., sixty seconds, ten minutes, one hour) passes after the last generation of a presentation view. Thus, presentation view 126 may be regularly replaced with a new or updated presentation view. Alternatively, a new presentation view may be generated at a random time (e.g., within a specified range of times) or when the data for which the presentation view is being pre-generated is altered or replaced. The presentation view in this implementation comprises an HTML view of the data, which may be created by first applying XML tags to the data and then applying a style sheet to convert the XML data to HTML.

In the presently discussed implementation of the embodiment of the invention depicted in FIG. 1, sometime after presentation view 126 is generated, browser 102 of client 100 originates an HTTP (Hypertext Transport Protocol) data request or operation and forwards it to middle-tier server 110. Servlet 112 receives and recognizes the request, parses it and creates an appropriate SQL (Structured Query Language) query to submit to Oracle Servers database 122. The servlet connects to data server 120 and the query is executed and the responsive data is identified. This data includes or matches the data for which presentation view 126 was generated. Thus, presentation view 126 is retrieved and returned to middle-tier server 110. Middle-tier server 110 then serves the presentation view to client 100.

In the embodiment of FIG. 1, presentation view 126 may be served in response to a data request even if the presentation view was generated from a stale or obsolete version of the data. For example, if trigger 124 operates on a time basis, the data may be changed between the time a first presentation view of the data is generated and the time a second view is generated. The stale presentation view may still be served in this situation because it is known that an updated view will soon be generated and it has been determined that it is more efficient to serve a stale view than to try and meet each request with a fresh view, which would require the expenditure of resources that are otherwise saved. If, for example, data changes are very frequent (e.g., every second), it may be inefficient and unwarranted to generate a new view for each data change; in this case a time-based trigger is appropriate. Alternatively, however, a fresh presentation view could be generated under a configurable set of circumstances—it is a relatively long period of time until the trigger initiates generation of a new view, the data rarely changes (in which case it may be more important to serve an updated view), etc.

A change-based trigger may be appropriate for relatively static data sets.

For example, for a database of news stories, a new (or updated) presentation view may be pre-generated each time a new (or replacement) story is added to the database.

Either a time-based or a change-based trigger may be appropriate, for example, with a database of stock quotes. In this example, a stock quote may change on a very frequent, somewhat frequent, relatively infrequent or other basis. Possibly depending on the individual quote, a presentation view may be generated every ten seconds, every minute, for each change, etc. In this example, the use of triggers to pre-generate presentation views of the data allows the system to quickly serve a relatively small set of data (e.g., there are a limited number of publicly traded stocks) to a potentially vast number of requests or requestors without expending a large amount of system resources.

An embodiment of the invention may be customized or tailored for a particular device or set of devices (e.g., a type of wireless telephone having specific capabilities or requirements). In this embodiment, a presentation view suitable for display on or use by a device may not be available when a first request is received from the device. Thus, this first request may require a presentation view to be generated (e.g., on a middle-tier server) after the requested data is located and retrieved in response to the request. However, in anticipation of a future request from the same or a similar device, the requirements of the device (or preferences of its user) may be noted and presentation views may then be pre-generated. The type of device, or its requirements or preferences may, for example, be included or identified in the header of a first HTTP request.

For a new device or a device not before encountered, a style sheet may not be available when a first request is received from the device. Then, when the first request is serviced an appropriate style sheet may be created or retrieved, and used from then on to pre-generate presentation views.

Figure 2:
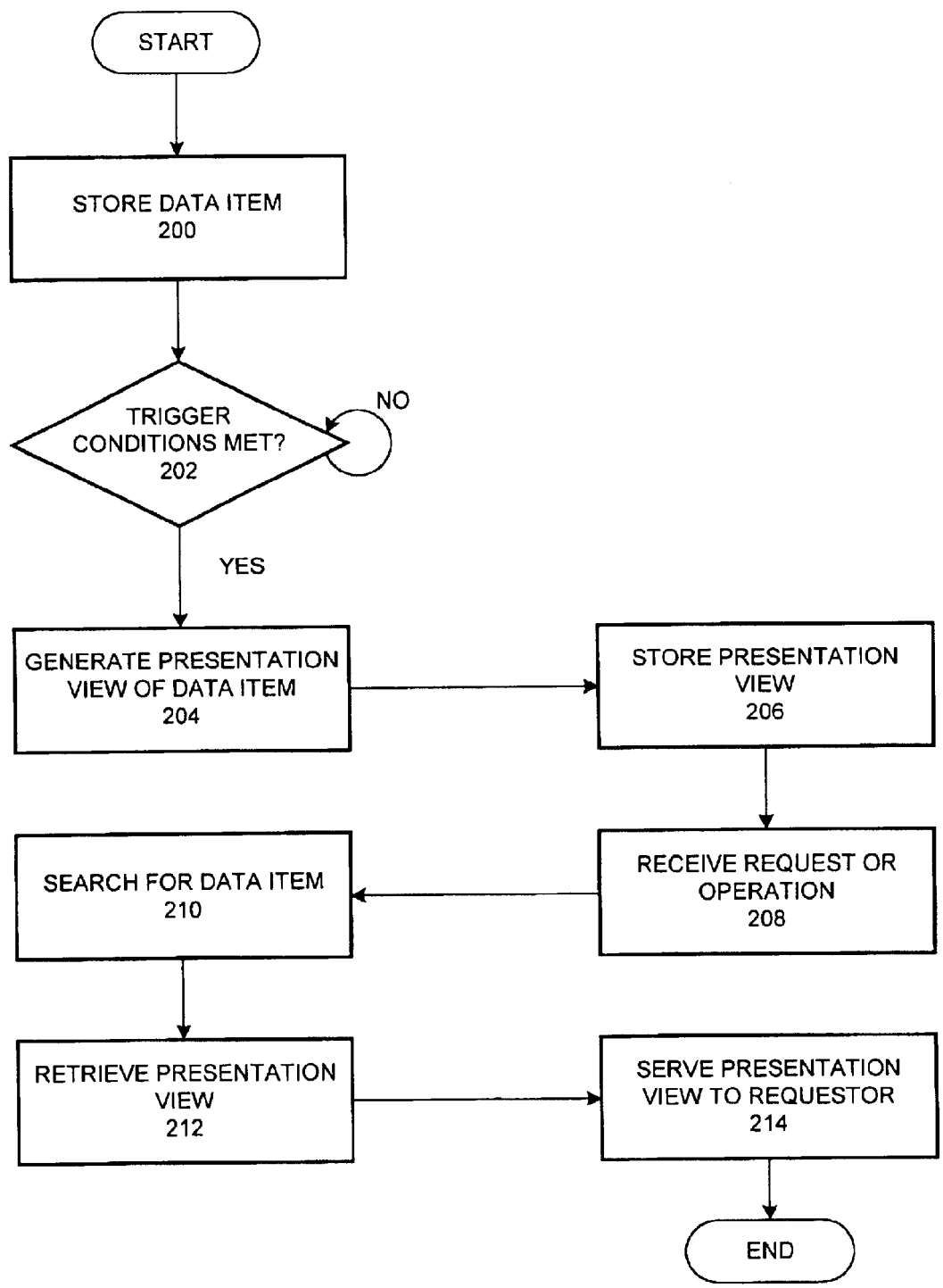
FIG. 2 is a flowchart illustrating one method of responding to a data request with a pre-generated presentation view of the requested data, in accordance with an embodiment of the invention.

FIG. 2 is a flowchart demonstrating one method of using triggers to pre-generate a presentation view of a data item for serving in response to a request for the data item, in accordance with one embodiment of the invention. Although the illustrated method is described in use in a three-tier environment, the method may be readily adapted for use in a different architecture (e.g., a client-server or two-tier environment). In a two-tier environment, for example, the composition and functions of the data server described below may be included in the middle-tier server.

In state 200, a data item is stored on a data server. The data item may, for example, be an entry (e.g., record, object) within a database table.

In state 202 it is determined whether the condition(s) of a pre-configured trigger associated with the data item has/have expired or been met. Thus, for a time-based trigger, it is determined whether the required period of time has expired since a previous presentation view of the data item was generated. For a change-based trigger, it is determined whether the data item was replaced, updated or otherwise altered since a previous presentation view of the data item was generated. Other types of triggers may depend on other parameters, operations or occurrences. For example, a trigger for one data item may be initiated by the operation of a trigger for another data item. Another trigger may be configured to fire when the data server is initialized, re-initialized or shut down.

One trigger may be associated with multiple data items, databases, tables or other sets of data and may be configured to operate differently for different sets of data (e.g., to generate presentation views for different sets of data upon different passages of time or events).

If the condition(s) of the trigger are met for the data item in state 202, the illustrated method proceeds to state 204. Otherwise, until trigger conditions are met, data operations (e.g., updates, replacements, presentations) are performed or time passes. Eventually, however, a trigger condition is satisfied (e.g., event or time passage) and the illustrated method continues to state 204.

In state 204 a presentation view of the data item is generated according to a profile or set of parameters associated with the data item. A profile or parameter may, for example, indicate the format of the presentation view (e.g., HTML, WML, plain text), indicate that multiple presentation views (e.g., in different formats) are to be generated, indicate where the presentation view is to be stored, etc. The presentation view may, for example, be stored as a file within the same database as the data item. Alternatively, the presentation view may be stored separate from the database, in which case a file name or other identifier of the view may be stored in the database to facilitate its retrieval.

Generation of the presentation view may comprise the execution of a stored procedure or a Java (or other) application built into the database. As one alternative, generation of the presentation view may involve the invocation of a utility or application external to the database. In short, the utilities, style sheets and other modules needed to compute or generate the presentation view may be part of the database that stores the data item or may be separate. Likewise, the trigger may operate as part of the database or external to it.

The presentation view is then stored, in state 206, possibly within the database.

In state 208, which occurs some time after the presentation view is generated, a request for the data item (or operation involving the data item) is received at a middle-tier server that has access to the data server. For example, in a network environment including the Internet or an intranet, a middle-tier server may act as a web server and receive data requests or operations from one or more client devices. The request may identify the type of device that sent the request, its capabilities or requirements, preferences for receiving the data (e.g., a preferred format), etc.

In state 210 the middle-tier initiates a search or retrieval of the requested data or the data involved in the operation. Illustratively, this may comprise the submission of a query to the database or data server.

In state 212, the data item is identified and the associated presentation view is retrieved. Where multiple views of the same data item (e.g., different formats, sizes, layouts) were generated, one or more parameters of the request or operation may be used to determine which view to retrieve.

In state 214 a presentation view suitable for the requesting device is returned to the middle-tier server and passed to the device. Alternatively, the presentation view may be forwarded directly from the data server to the device.

FIG. 2 and the preceding description illustrate just one method for using a trigger to pre-generate presentation views of data for responding to data requests. In other embodiments of the invention alternative methods derivable from the illustrated method may be implemented.

The foregoing descriptions of embodiments of the invention have been presented for purposes of illustration and description only. They are not intended to be exhaustive or to limit the invention to the forms disclosed. Many modifications and variations will be apparent to practitioners skilled in the art. Accordingly, the above disclosure is not intended to limit the invention; the scope of the invention is defined by the appended claims.

What is claimed is:

1. A method of responding to a data request, the method comprising:

receiving at a first server a request for data;

querying a database containing said data;

retrieving a pre-generated presentation view of said data;

serving said presentation view in response to said request;

recognizing the passage of a pre-determined period of time;

generating an updated presentation view of said data, regardless of whether said data has changed; and replacing said presentation view with said updated presentation view.

2. The method of claim 1, further comprising:

detecting a change made to said data;

generating an updated presentation view of said data; and replacing said presentation view with said updated presentation view.

3. The method of claim 1, wherein said request is received from a browser and said presentation view is configured to be displayable by said browser.

4. The method of claims 3, wherein said request is formatted according to the Hypertext Transport Protocol and said presentation view is formatted according to Hypertext Markup Language.

5. A method of serving data, comprising:

maintaining a database containing data responsive to data requests;

in response to a time-based trigger, composing a presentation view of a first data item in said database;

storing said presentation view;

receiving a first request for said first data item;

retrieving said stored presentation view; and serving said presentation view in response to said first request even if said presentation view of said first data item is stale.

6. The method of claim 5, wherein said time-based trigger comprises the passage of a period of time.

7. The method of claim 6, wherein said trigger comprises the passage of said period of time after a change in said first data item.

8. The method of claim 5, wherein said storing occurs before said receiving.

9. The method of claim 5, wherein said composing comprises formatting said first data item according to the Extensible Markup Language.

10. The method of claim 5, wherein said composing comprises formatting said first data item according to the Hypertext Markup Language.

11. The method of claim 5, wherein said composing comprises applying a style sheet to said first data item.

12. A database server, comprising:

a first database configured to store data items, wherein said database is searchable by queries;

a second database configured to store presentation views of said data items; and a database engine configured to generate said presentation views in response to a time-based trigger;

wherein a first presentation view of a first data item is retrieved in response to a query configured to search said first database for said first data item.

13. The database server of claim 12, wherein said trigger comprises the passage of a predetermined period of time.

14. The database server of claim 13, wherein said trigger comprises the passage of said predetermined period of time after a change to said first data item.

15. The database server of claim 12, wherein said first database comprises said second database.

16. The database server of claim 12, wherein said database engine is configured to apply a style sheet to said first data item.

17. The database server of claim 12, wherein said presentation view is configured to be displayable by an originator of said query.

18. A server configured to serve data in response to data requests, comprising:

request means configured to receive a first request for a first data item stored in a database;

query means configured to query said database for said first data item;

retrieval means configured to receive a presentation view of said first data item in response to said query; and response means configured to serve said presentation view in response to said first request even if said presentation view of said first data item is stale;

wherein said presentation view was generated prior to said receipt of said first request.

19. The server of claim 18, wherein said database and said presentation view are stored on a data server.

20. The server of claim 19, wherein said presentation view is replaced by an updated presentation view generated in accordance with a trigger.

21. The server of claim 20, wherein said trigger comprises the passage of a predetermined period of time.

22. The server of claim 20, wherein said trigger comprises a change to said first data item.

23. A computer readable storage medium storing instructions that, when executed by a computer, cause the computer to perform a method of responding to a data request, the method comprising:

maintaining a database containing data responsive to data requests;

in response to a time-based trigger, composing a presentation view of a first data item in said database;

storing said presentation view;

receiving a first request for said first data item;

retrieving said stored presentation view; and serving said presentation view in response to said first request even if said presentation view of said first data item is stale.

24. A computer readable storage medium containing a data structure configured to store data to server in response to data requests, the data structure comprising:

a set of data items searchable in response to data requests; and a presentation view of one of said data items, wherein said presentation view is generated according to a time-based trigger in anticipation of a data request for said one data item;

wherein said presentation view is configured to be displayable by an originator of said data request; and said presentation view is displayable even if said presentation view of said one data item is stale.

* * * * *